Oct. 26, 1954  C. D. FOSS  2,692,783
DUST GUARD AND SEAL FOR INNER ENDS OF JOURNAL BOXES
Filed April 18, 1947  2 Sheets-Sheet 1
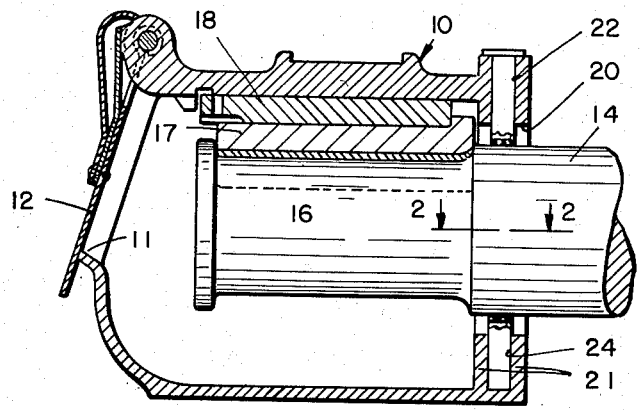
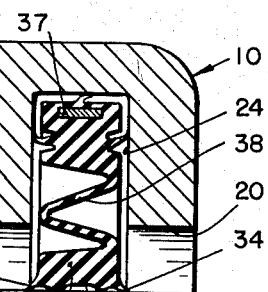
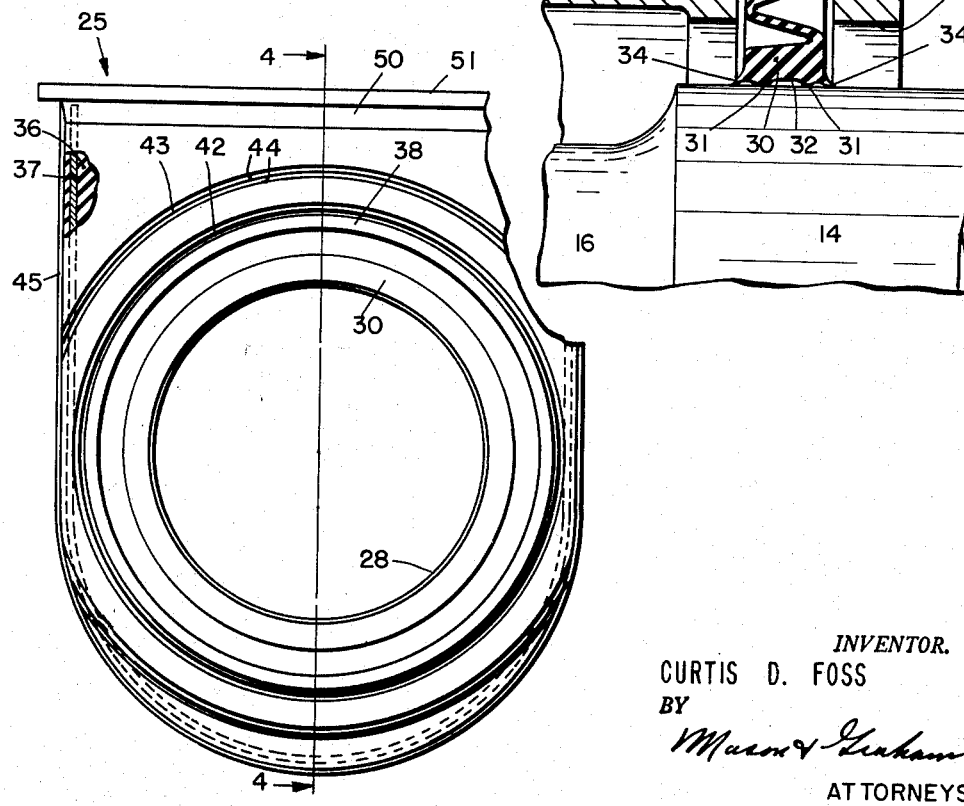
INVENTOR.
CURTIS D. FOSS
BY
ATTORNEYS

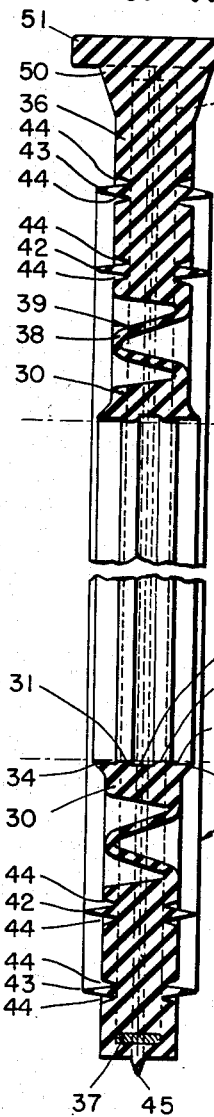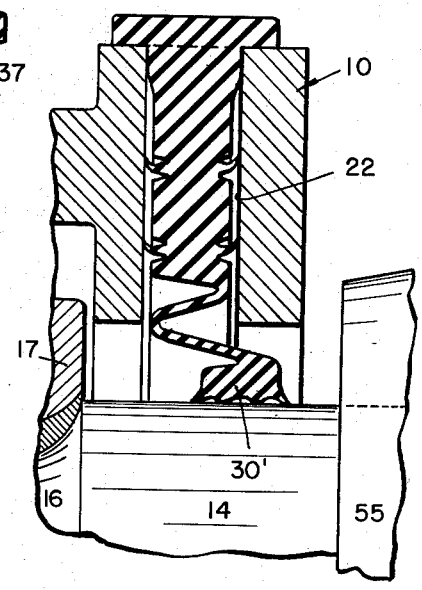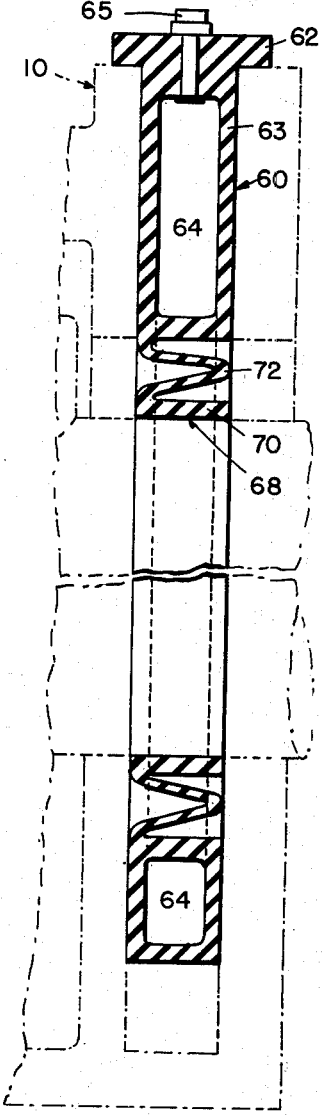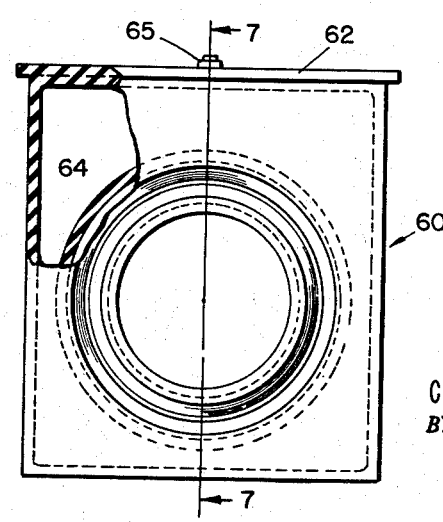

Patented Oct. 26, 1954

2,692,783

UNITED STATES PATENT OFFICE 2,692,783

DUST GUARD AND SEAL FOR INNER ENDS OF JOURNAL BOXES

Curtis D. Foss, Bell, Calif.

Application April 18, 1947, Serial No. 742,423

4 Claims. (Cl. 286—6)

This invention relates generally to means for effecting a seal between a rotating shaft or axle and a stationary housing. The invention particularly relates to dust guard seals used at the inner ends of the journal boxes of railroad cars.

This application is a continuation in part of my copending application for Closing and Sealing Device for Journal Boxes, Serial No. 669,435, now abandoned.

It is an object of this invention to provide a novel flexible sealing means adapted to fit standard railway car journal boxes for effecting a seal between the axle and the inner end portion of the journal box to prevent escape of lubricant and entry of dust and other foreign matter. In this connection it is a particular object to provide a sealing means which will effectively prevent escape of a liquid lubricant such as oil from the journal box and thereby provide a seal means which may be used in conjunction with a suitable sealing means for the journal box door or cover for sealing the opening at the outer end of the box, such for example as the cover seal means set forth in my copending application for patent on a Journal Box Cover Seal, Serial No. 710,635, now Patent No. 2,540,662, and thereby make it possible to utilize oil in the present standard types of journal boxes for lubricating the journals in place of the objectionable lubricant-saturated waste presently employed.

It is also an object of the invention to provide a resilient seal member mountable in the journal box which receives the axle and is adapted to absorb and accommodate itself to movements of the axle both longitudinally and radially, resulting from normal operation of the car and frequently resulting from shocks and jars to which the car is subjected.

It is also an object of the invention to provide such a resilient seal member which embodies wiper portions on opposite sides of the portion of the member forming the bearing and sealing surface with the axle, which wiper portions contact the axle and remove lubricant and foreign matter therefrom preventing the same from reaching the bearing and sealing surface portions of the seal member.

It is a further object of the invention to provide a sealing member of the type indicated which, when installed in a standard railway car journal box, effects a seal between the member and the standard dust guard slot or well of the box, thereby effectively preventing escape of lubricant from the box and entrance of foreign matter thereinto in the region of the box.

It is also an object of the invention to provide a dust guard and lubricant seal of the type indicated which may be readily installed in a standard journal box and which is so constructed that it may be driven into place and when forced in becomes wedged firmly in the box so that it will not come loose until forcibly removed. In this connection, it is an object to provide a sealing member which is reversible in the sense that it has no particular inner or outer side and hence may be readily installed without danger that it will be incorrectly mounted.

It is a still further object of the invention to provide a sealing means for effecting a seal between the inner end portion of a journal box and the car axle and additionally the outer surface of the car wheel.

These and other objects will be apparent from the drawings and the following description thereof. Referring to the drawings, which are for illustrative purposes only:

Fig. 1 is a longitudinal vertical sectional view through a railway car journal box with the seal means of the invention (broken away) shown installed therein with relation to the car axle;

Fig. 2 is a fragmentary sectional plan view on line 2—2 of Fig. 1;

Fig. 3 is an enlarged face view of the sealing member of my invention;

Fig. 4 is a section on line 4—4 of Fig. 3;

Fig. 5 is a longitudinal fragmentary vertical section through the inner end portion of a journal box showing a modified form of sealing member installed therein;

Fig. 6 is a face view partly in section of a modified form of sealing member; and Fig. 7 is a section on line 7—7 of Fig. 6.

More particularly describing the invention, reference numeral 10 generally indicates the railway car journal box which is provided at its outer end with an opening 11 and a suitable cover 12 therefor. 15 indicates the end of a car axle, the journal portion 16 of which is shown in contact with bearing 17 below the standard bearing wedge 18.

The inner end of the journal is provided with an opening 20 which is defined by an inwardly projecting double rear wall 21. This wall has a vertically extending slot 22 formed in the upper part, and a recess or groove 24 extending down the sides and across the bottom of the box. In the form of journal box shown, the bottom is arcuate in cross section and corresponds in shape to the lower end of the seal member 25 (Fig. 3) to be described. The slot 22 and groove 24 are standard construction and form what is called the dust guard slot or well.

Referring particularly to Figs. 1-4 for more detailed description of the sealing member 25 of the invention, the member is preferably formed of a rubber-like material which is oil resistant. The member is generally of a flat or plate-like form and is provided with an aperture or opening 28 for the axle. The opening is formed to be of slightly less diameter than the portion of the axle 14 which it receives. The opening 28 is defined by what will be termed a seal ring 30 which is an annular, relatively thick section provided with a pair of annular ridges 31 on its inner surface spaced apart to define an annular groove 32 which may be used for retaining lubricant. Outwardly of the two ridges 31 at each side of the seal ring is a wiper lip or flange 34, the end of which contacts the surface of the axle 14 when the axle is received within the seal ring. It may be noted that, as shown in Fig. 4, when the seal ring is in normal unexpanded position the lips or wiper flanges 34 do not extend inwardly as far as the ridges 31 but, as shown in Fig. 2, when the seal ring is expanded to accommodate the axle the tip edge of these wipers contact the surface of the axle.

Outwardly of the seal ring and in the same plane is a marginal portion 36 which may be termed the main body of the seal member. This portion is preferably formed of solid material and is reinforced by means of a suitable U-shaped flat strip of metal, such as indicated by 37 and shown in Figs. 2 and 3. However, other reinforcing means might be used.

The seal ring is resiliently supported by means of an intermediate bellows-like section 38 which comprises a corrugated relatively thin wall section 39. This intermediate section provides a very flexible resilient support for the seal ring, thereby enabling the seal ring to move axially of the axle and radially thereof as may be caused by normal or abnormal movements of the axle. At the same time the two ridges 31 provide an effective seal in the region of the axle for preventing entry of dust or foreign matter into the journal box and for preventing escape of lubricant therefrom.

The marginal portion or main body of the seal is preferably provided with a pair of annular laterally extending lips on each side indicated by numerals 42 and 43. The outer lip 43 is interrupted at each side of the device. These lips are preferably bounded on each side by grooves 44 which serve to increase the flexibility of the lips. In addition to the aforementioned lips, the sealing member is provided with a peripheral lip 45. The lips act as sealing rings engaging the sides and end of the dust guard slot and thereby effectively seal the seal member within the journal box and prevent any entry of dust or foreign matter around the periphery of the seal member and into the box and likewise prevent escape of lubricant in this region. It will be noted in this connection that the main body of the seal is slightly smaller in size than the dust guard slot and that the lips extend beyond the body of the seal sufficiently to insure their contacting and being deflected by the slot thereby sealing the parts see Fig. 2).

At its upper end the main body of the seal is tapered outwardly at 50 to a width in excess of that of the slot 22 and terminates in a flanged portion 51 which acts as a cover extending over the top of the slot when the member is in place.

With the construction outlined, in order to install the seal member in the dust guard slot of the journal box, it is only necessary to force or drive the member down in the dust guard slot. This may readily be done since the reinforcing member 37 imparts sufficient rigidity to the member for this purpose.

In Fig. 5 there is shown a modified form of the invention wherein the sealing ring here indicated by 30′ is mounted in such a manner that normally it is not in the plane of the remainder of the seal member but projects toward the car wheel 55. This construction insures against any possibility of the seal riding of the portion 14 of the axle onto the journal 16, as might happen infrequently on old equipment.

In Figs. 6 and 7 there is shown another form of the invention wherein the seal member indicated generally by 60 is shown as being rectangular in plan. It will be understood that the lower end of the seal member would be made arcuate for a journal having a rounded bottom and that the seal member 25 previously described would be made rectangular in plan for use on journal boxes that are rectangular in cross section.

The seal member 60 has a top flange 62 which fits over the top of the box and acts as a cover. The marginal portion or main body 63 of this seal member has a cavity 64 which may be inflated through a suitable valve 65. The member is inflated after it is positioned in place and the air pressure within the main body of the seal member forces it into tight sealing engagement with the dust guard slot.

In this form of the invention the seal ring, generally indicated by 68, has been shown as an axially extending band 70 adapted to encircle the axle and outwardly of this is a corrugated intermediate thin walled section 72 which supports the seal ring in the same manner as the portion 38 of the ring shown in Figs. 1-4.

It will be apparent that the invention, designed for standard equipment, provides a very flexible positive seal at the inner end of the journal box such as may be used either on present waste-type lubricated journals or for retaining a body of liquid lubricant within the journal box. In all cases the invention serves to keep out dust and foreign matter from the journal box. It will also be apparent that various changes and modifications can be made in the invention as shown and described without departing from the invention's scope as set forth in the claims.

I claim:

1. A lubricant seal and dust guard adapted to be mounted in the dust guard slot of a journal box comprising a plate-like member formed of rubber-like material, said member having an outer relatively stiff marginal main body, an inner sealing ring for receiving an axle extending into the journal box, and a relatively thin-walled corrugated section extending between the main body and the ring, said main body having an annular laterally projecting lip on each side adapted to engage the sides of the dust guard slot and having a peripheral lip adapted to engage the end of the dust guard slot.

2. A lubricant seal and dust guard adapted to be mounted in the dust guard slot of a journal box comprising a plate-like member formed of rubber-like material, said member having an outer relatively stiff marginal main body, an inner sealing ring for receiving an axle extending into the journal box, and a relatively thin-walled corrugated section extending between the main body and the ring, said main body having an annular laterally projecting lip on each side adapted to engage the sides of the dust guard slot and having a peripheral lip adapted to engage the end of the dust guard slot, said main body being outwardly flared at its upper end and terminating in a flange adapted to act as a cover when the device is positioned in the dust guard slot, said outwardly flared portion being in part wider than the dust guard slot whereby said portion must be wedged into the dust guard slot when the device is installed.

3. A lubricant seal and dust guard adapted to be mounted in the dust guard slot of a journal box comprising a plate-like member formed of rubber-like material, said member having an outer relatively stiff marginal main body, an inner sealing ring defining an opening for receiving an axle extending into the journal box, a thin-walled resilient circularly corrugated annular intermediate section between the main body and the ring, said sealing ring being unrestrained except by said intermediate section whereby the ring is free to move axially and in any radial direction, said main body having a straight upper edge and having straight side edges terminating in a curved lower edge, and a U-shaped reinforcing member embedded in said main body in the side and bottom marginal edge portions thereof.

4. A lubricant seal and dust guard adapted to be mounted in the dust guard slot of a journal box comprising a plate-like member formed of rubber-like material, said member having an outer relatively stiff marginal main body, an inner sealing ring defining an opening for receiving an axle extending into the journal box, and a thin-walled resilient circularly corrugated annular intermediate section between the main body and the ring, said sealing ring being unrestrained except by said intermediate section whereby the ring is free to move axially and in any radial direction, said main body having a straight upper edge and having straight side edges terminating in a curved lower edge.

References Cited in the file of this patent

UNITED STATES PATENTS

| Number | Name | Date |
| --- | --- | --- |
| 270,262 | Sweeney | Jan. 9, 1883 |
| 987,799 | Floyd | Mar. 28, 1911 |
| 2,103,555 | Rowe | Dec. 28, 1937 |
| 2,181,203 | Reynolds | Nov. 28, 1939 |
| 2,241,870 | Scribner | May 13, 1941 |
| 2,257,119 | Johannesen | Sept. 30, 1941 |
| 2,394,012 | Rayburn | Feb. 5, 1946 |

FOREIGN PATENTS

| Number | Country | Date |
| --- | --- | --- |
| 544,732 | Great Britain | of 1942 |
| 562,456 | Great Britain | of 1944 |